United States Patent
Joe et al.

(10) Patent No.: US 9,678,646 B2
(45) Date of Patent: Jun. 13, 2017

(54) ELECTRONIC DEVICE AND COMPUTER-READABLE RECORDING MEDIUM STORING INFORMATION DISPLAY PROGRAM

(71) Applicant: FUJITSU LIMITED, Kawasaki-shi, Kanagawa (JP)

(72) Inventors: Hideaki Joe, Funabashi (JP); Taichi Noro, Kawasaki (JP); Hiroki Yamada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 106 days.

(21) Appl. No.: 14/675,130

(22) Filed: Mar. 31, 2015

(65) Prior Publication Data
US 2015/0286378 A1  Oct. 8, 2015

(30) Foreign Application Priority Data
Apr. 8, 2014  (JP) .................................. 2014-079479

(51) Int. Cl.
*G09G 5/00* (2006.01)
*G06F 3/0484* (2013.01)
(Continued)

(52) U.S. Cl.
CPC ........ *G06F 3/04845* (2013.01); *G06F 3/0481* (2013.01); *G06F 3/0488* (2013.01);
(Continued)

(58) Field of Classification Search
CPC ............. G06F 3/04842; G06F 3/04845; G06F 2203/04805; G06F 2203/04806
See application file for complete search history.

(56) References Cited

U.S. PATENT DOCUMENTS

2006/0001650 A1\* 1/2006 Robbins ................ G06F 3/0421
 345/173
2008/0238947 A1  10/2008 Keahey et al.
(Continued)

FOREIGN PATENT DOCUMENTS

DE  10310794  9/2004
JP  2012-521048  9/2012
WO  2010/107653  9/2010

OTHER PUBLICATIONS

The Extended European Search Report of European Patent Application No. 15161564.8 dated Sep. 24, 2015. \*\*US2010/235726A1 cited in the above listed EESR was previously submitted in the IDS filed on Mar. 31, 2015. \*\*.

(Continued)

*Primary Examiner* — Charles Tseng
(74) *Attorney, Agent, or Firm* — Fujitsu Patent Center

(57) ABSTRACT

An electronic device includes a magnified view window display unit configured to display a magnified view window to magnify and display an area including a first touched position, a magnified view window size change unit configured to enlarge a size of the magnified view window based on the first touched position and a second touched position when a touched position moves to the second touched position from the first touched position, and a view target area determining unit configured to determine a display target area including the second touched position corresponding to the size of the magnified view window and to display the display target area on the magnified view window.

4 Claims, 14 Drawing Sheets

(51) Int. Cl.
*G06T 3/40* (2006.01)
*G06F 3/0488* (2013.01)
*G06F 3/0481* (2013.01)

(52) U.S. Cl.
CPC ............ *G06F 3/04883* (2013.01); *G06T 3/40* (2013.01); *G06F 2203/04805* (2013.01); *G06F 2203/04806* (2013.01); *G06T 2200/24* (2013.01)

(56) References Cited

U.S. PATENT DOCUMENTS

| | | |
|---|---|---|
| 2010/0235726 A1 | 9/2010 | Ording et al. |
| 2010/0235729 A1 | 9/2010 | Kocienda et al. |
| 2010/0235734 A1 | 9/2010 | Ording et al. |
| 2010/0235735 A1 | 9/2010 | Ording et al. |
| 2010/0235770 A1 | 9/2010 | Ording et al. |
| 2010/0235778 A1 | 9/2010 | Kocienda et al. |
| 2010/0235783 A1 | 9/2010 | Ording et al. |
| 2010/0235784 A1 | 9/2010 | Ording et al. |
| 2010/0235785 A1 | 9/2010 | Ording et al. |
| 2010/0235793 A1 | 9/2010 | Ording et al. |
| 2011/0289462 A1 | 11/2011 | Harris et al. |
| 2013/0002719 A1 | 1/2013 | Ide |
| 2013/0141361 A1* | 6/2013 | Endo .................. G06F 3/04883 345/173 |
| 2014/0181737 A1 | 6/2014 | Hwang et al. |

OTHER PUBLICATIONS

EPOA—The Office Action of European Patent Application No. 15161564.8 dated Oct. 6, 2016. ** All references cited in the EPOA were previously submitted in the IDS filed on Dec. 17, 2015 and Mar. 31, 2015.

* cited by examiner

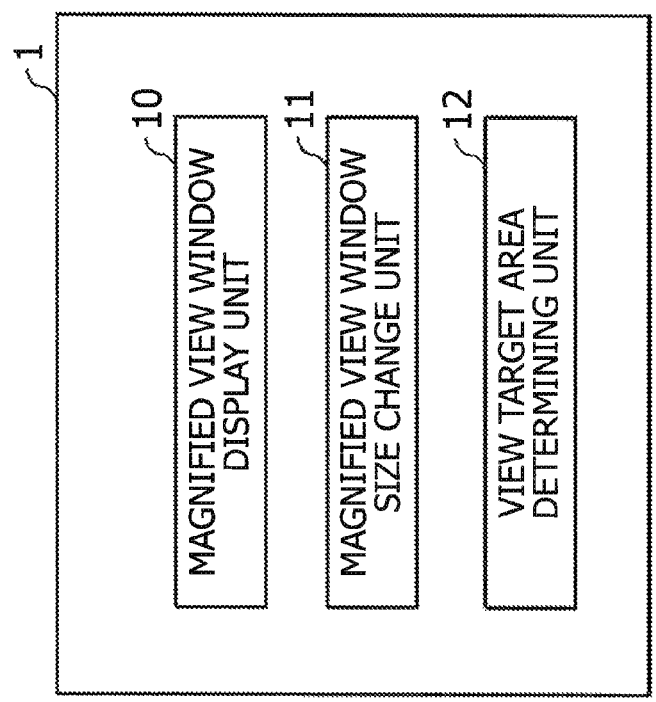

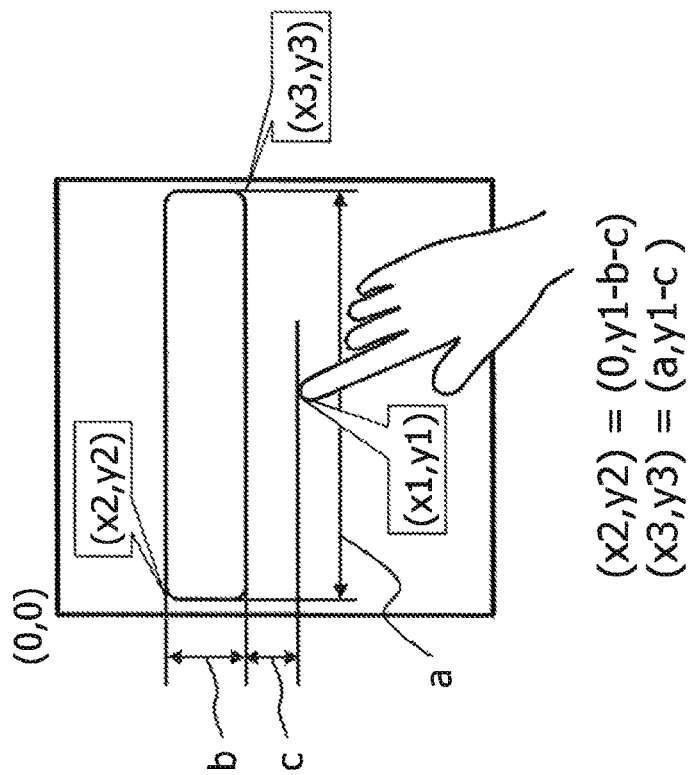

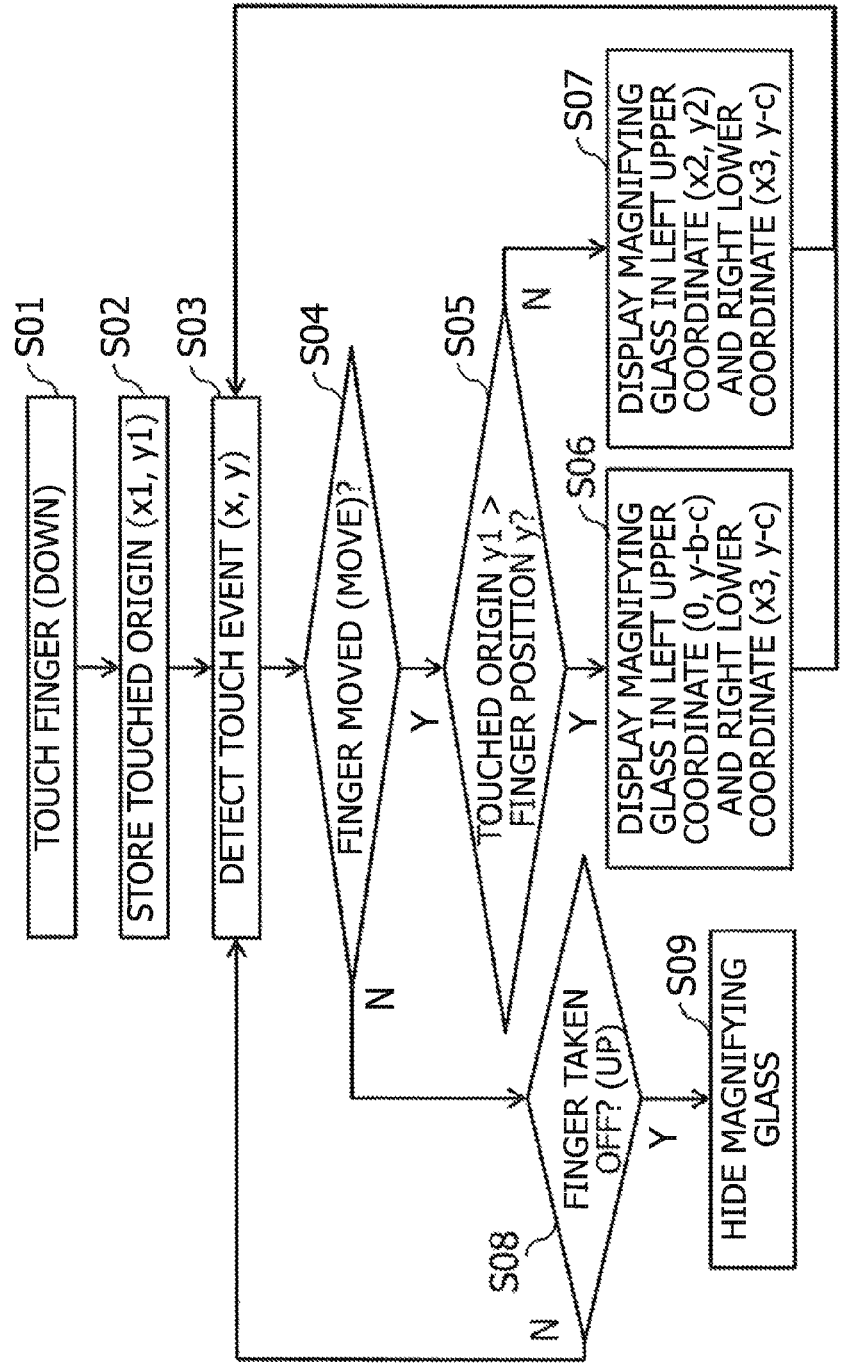

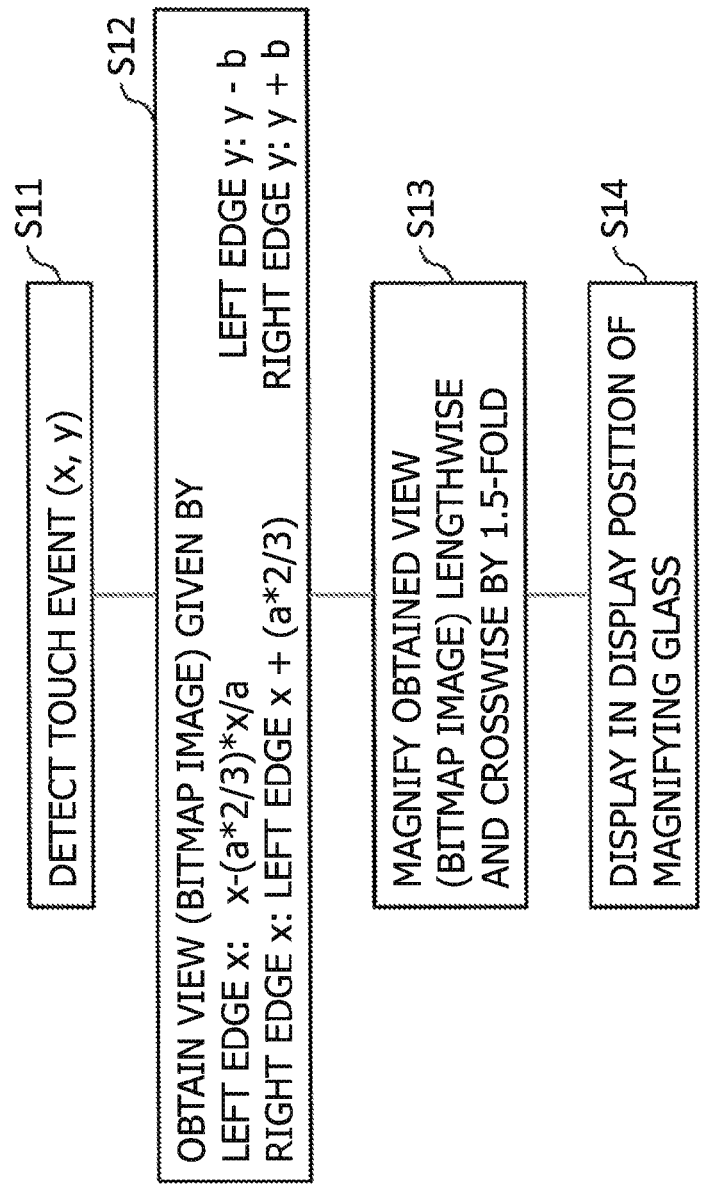

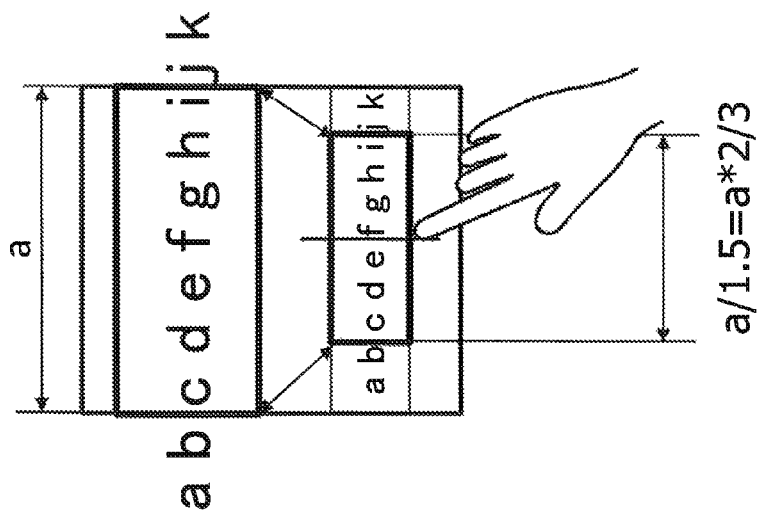

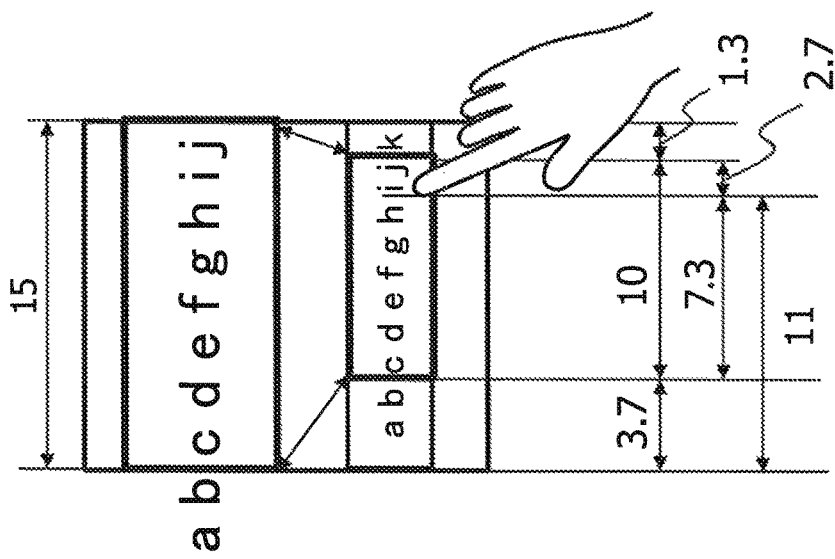

_US 9,678,646 B2_

ELECTRONIC DEVICE AND COMPUTER-READABLE RECORDING MEDIUM STORING INFORMATION DISPLAY PROGRAM

CROSS-REFERENCE TO RELATED APPLICATION

This application is based upon and claims the benefit of priority of the prior Japanese Patent Application No. 2014-079479, filed on Apr. 8, 2014, the entire contents of which are incorporated herein by reference.

FIELD

The embodiments discussed herein are related to an electronic device and a computer-readable recording medium storing an information display program.

BACKGROUND

In recent years, touch panel type electronic devices have spread, which may execute a variety of operations by a touch input onto a panel. A variety of touch panel type electronic devices are exemplified such as a mobile phone terminal, a smartphone, a tablet terminal, an e-book terminal and a personal computer (PC).

One of the operations on the panel is an operation of selecting characters contained in a displayed image. When selecting the characters, the characters are hard to be selected due to the characters being small, and a selected portion is hard to be recognized because of being hidden under a finger as the case may be.

To cope with these drawbacks, a technology (refer to, e.g., Patent document 1) is known, which displays the selected portion in magnification in another area.

[Patent document 1] Japanese National Publication of International Patent Application No. 2012-521048

SUMMARY

One aspect of the embodiments is exemplified by an electronic device. The electronic device includes a magnified view window display unit configured to display a magnified view window to magnify and display an area including a first touched position, a magnified view window size change unit configured to enlarge a size of the magnified view window based on the first touched position and a second touched position when a touched position moves to the second touched position from the first touched position, and a view target area determining unit configured to determine a display target area including the second touched position corresponding to the size of the magnified view window and to display the display target area on the magnified view window.

Another aspect of the embodiments can encompass an information display program to make a computer function as the electronic device described above, and a non-transitory computer readable recording medium on which the program is recorded. The recording medium readable by the computer etc. connotes a recording medium that can store information such as data and programs electrically, magnetically, optically, mechanically or by chemical action, which can be read from the computer etc.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 2 is a diagram illustrating one example of function blocks of the electronic device;

FIG. 7 is a diagram illustrating an example of calculating a display position and a display size of the magnifying glass when touching the screen;

FIG. 8 is a diagram illustrating one example of a flowchart of processes when detecting a touch event;

FIG. 9 is a diagram illustrating one example of a flowchart of processes of determining a display target area and displaying the display target area on the magnifying glass when detecting a touch event;

FIG. 10 is a diagram illustrating an example of determining the display target area based on a post-moving touched position and a magnifying power of a magnified view; and FIG. 11 is a diagram illustrating a specific example of determining the display target area based on the post-moving touched position and the magnifying power of the magnified view.

DESCRIPTION OF EMBODIMENTS

However, a magnified view window (which will hereinafter be also referred to as a magnifying glass) for displaying the selected portion in magnification has hitherto been difficult to confirm the whole selected portion by looking down upon the selected portion because of a size being fixed and being moved with a movement of a finger.

An embodiment of the present invention will hereinafter be described based on the drawings. A configuration of the following embodiment is an exemplification, and the present invention is not limited to the configuration of the embodiment.

Example 1

The Example 1 is such an example that an electronic device magnifies and displays an area covering a touch position on a magnifying glass, and a size of the magnifying glass is enlarged corresponding to a movement of the touch position.

Figure 3A:
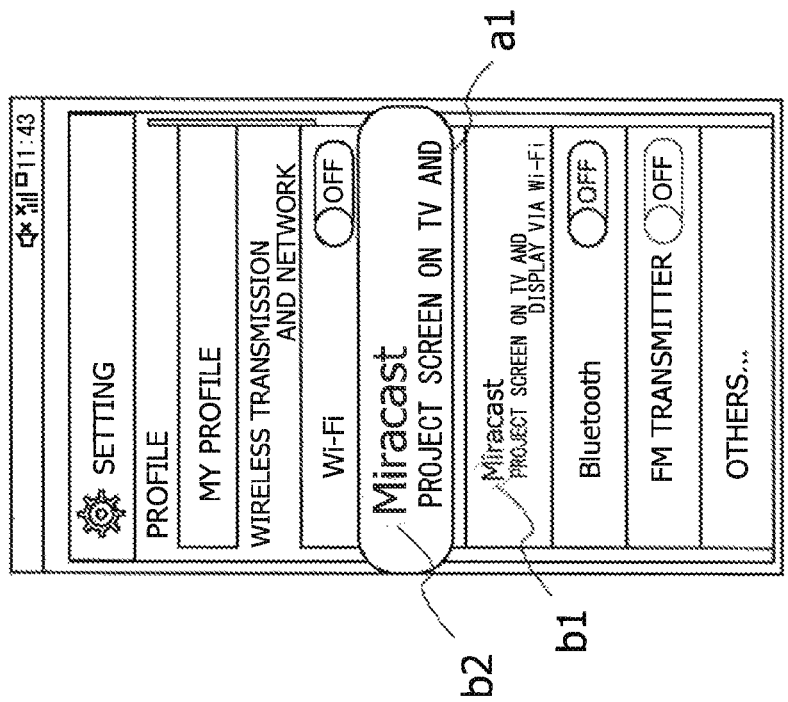
FIG. 3A is a diagram depicting a display example of a magnifying glass during an operation of selecting a setting menu screen.
Figure 3B:
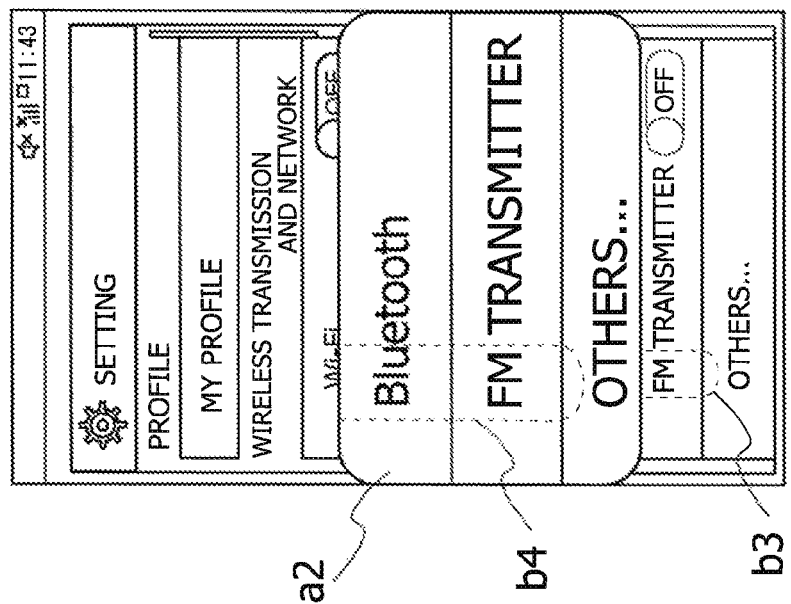
FIG. 3B is a diagram depicting a display example of the magnifying glass during the operation of selecting the setting menu screen.
Figure 3C:
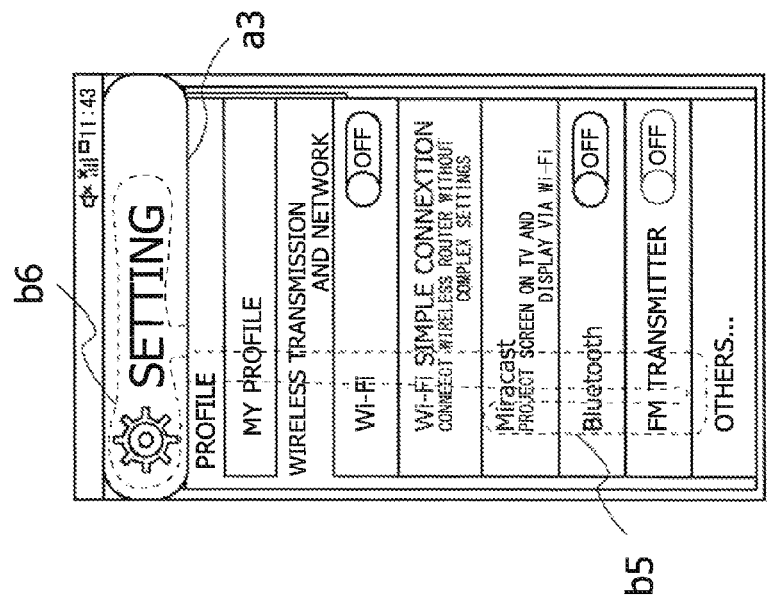
FIG. 3C is a diagram depicting a display example of the magnifying glass during the operation of selecting the setting menu screen.

FIGS. 3A through 3C are diagrams each illustrating a display example of the magnifying glass during an operation to select a setting menu screen. FIGS. 3A through 3C respectively depict the examples of the setting menu screen of a smartphone.

FIG. 3A depicts a state after touching a letter "M" of "Miracast" as one of menu items. A symbol "a1" indicates the magnifying glass displayed on the setting menu screen. A portion encircled by a dotted line of "b1" represents a position touched by a user. A portion encircled by a dotted line of "b2" represents a portion corresponding to the touched position indicated by "b1" in a magnifying glass a1. Note that the electronic device may display a marker like an image of a highlighter pen to facilitate recognition of the touched position, the maker being formed as, e.g., a frame of the dotted line of each of "b1" and "b2". In other words, on the screen of the actual smartphone, the portions encircled by the dotted lines of "b1" and "b2" may be displayed in a different background color from that of a peripheral area. The magnifying glass a1 is displayed on the upper side of a portion encircled by the dotted line of "b1". The characters "Miracast" containing the touched position indicated by "b1" and a peripheral area thereof are magnified and displayed on the magnifying glass a1.

FIG. 3B illustrates a state after a finger moving to downward to a menu item "Others" with the finger not being taken off from the state of touching the letter "M" of "Miracast" in FIG. 3A. A symbol "a2" indicates the magnifying glass displayed on a setting menu screen. A portion encircled by a dotted line of "b3" depicts a trajectory of the finger when moving downward to the menu item "Others" with the finger not being taken off from the state of touching the letter "M" of "Miracast". A portion encircled by a dotted line of "b4" indicates a portion corresponding to the finger's trajectory indicated by "b3" in the magnifying glass a2. Note that the electronic device may also display the marker like the image of the highlighter pen, the marker being formed as the frame of the dotted line of each of "b3" and "b4", to facilitate the recognition of the trajectory traced by the finger. In other words, on the screen of the actual smartphone, the portions encircled by the dotted lines of "b3" and "b4" may be displayed in the different background color from that of the peripheral area. A view of the magnifying glass a2 is enlarged downward to an upper area of the position of the finger after being moved. The position of the finger after being moved and the upper area thereof are magnified and displayed on the magnifying glass a2.

FIG. 3C illustrates a state after the finger moving upward to characters "Setting" as a menu title with the finger not being taken off subsequent to the downward movement to the menu item "Others" in FIG. 3B. A symbol "a3" represents a magnifying glass displayed on the setting menu screen. A portion encircled by a dotted line of "b5" represents a trajectory of the finger when moving upward to the characters "Setting" as the menu title with the finger not being taken off through the state in FIG. 3B from the state in FIG. 3A. A portion encircled by a dotted line of "b6" represents a portion corresponding to the finger's trajectory on the screen of the smartphone in the magnifying glass a3. However, the finger's trajectory corresponding to the portion encircled by the dotted line of "b6" is not depicted because of being positioned under the magnifying glass a3. The characters "Setting" and the peripheral area thereof are magnified and displayed on the magnifying glass a3. Note that the electronic device may display the marker like the image of the highlighter pen to facilitate the recognition of the trajectory traced by the finger, the maker being formed as, e.g., the frame of the dotted line of each of "b5" and "b6". In other words, on the screen of the actual smartphone, the portions encircled by the dotted lines of "b5" and "b6" may be displayed in the different background color from that of the peripheral area.

In the example of FIG. 3C, when the finger moves upward, it is taken into consideration that a text is read normally downward, and the electronic device does not enlarge the size of the magnifying glass upward from the touched position before the movement. However, the electronic device may enlarge the size of the magnifying glass depending on a content displayed on the screen even when the finger moves upward. Further, FIGS. 3A through 3C depict the examples in which a size of horizontal width of the magnifying glass is fixed, however, the size of horizontal width of the magnifying glass in FIG. 3A may be enlarged from a smaller size than a size of horizontal width of the screen to the size of horizontal width of the screen. In other words, the size of horizontal width of the magnifying glass does not need to be fixed in the Example 1.

Figure 4A:
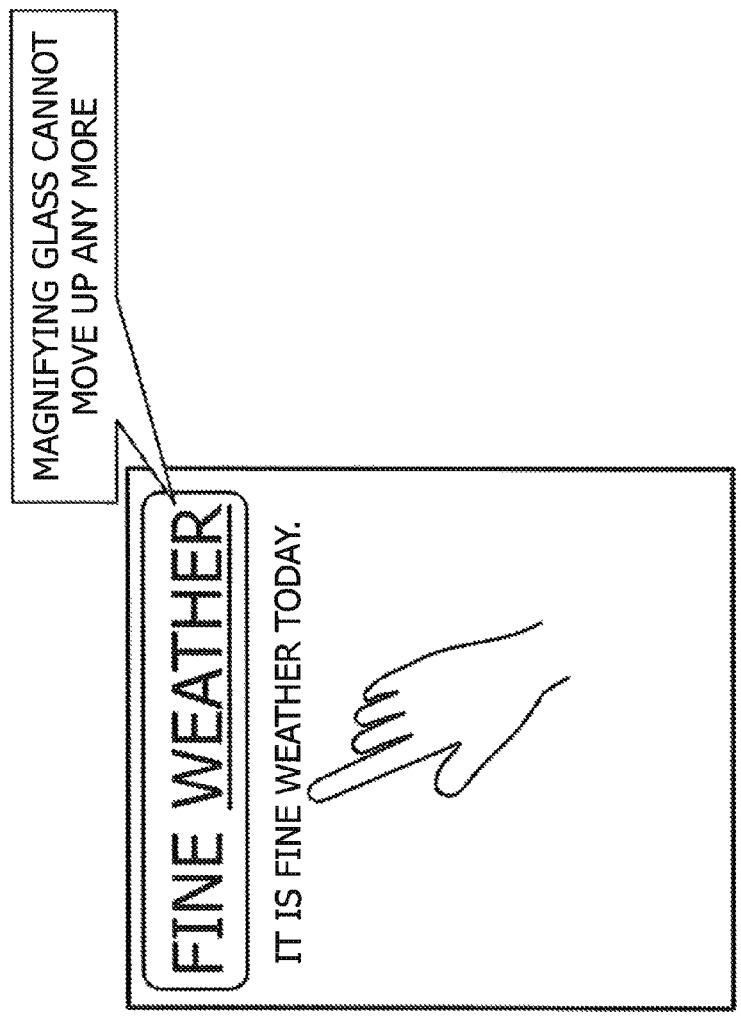
FIG. 4A is a diagram illustrating an example in which the magnifying glass is displayed at an uppermost portion of the screen.
Figure 4B:
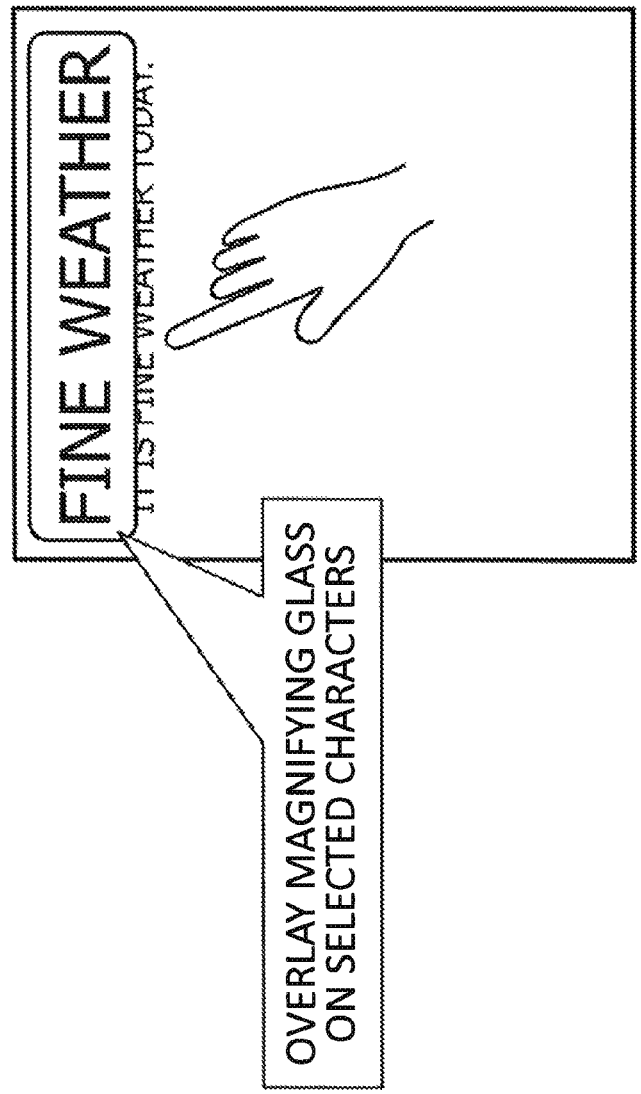
FIG. 4B is a diagram illustrating an example in which the magnifying glass is overlaid on selected characters and displayed at an uppermost portion of the screen.

FIG. 4A is a diagram illustrating an example of displaying the magnifying glass at an uppermost portion of the screen. To be specific, FIG. 4A depicts a state in which a position between "FINE" and "WEATHER" of a sentence "IT IS A FINE WEATHER TODAY." is touched by the finger. The magnifying glass is displayed on the upper side of the touched position, and the characters anterior and posterior to the touched position are magnified and displayed on the magnifying glass. FIG. 4B is a diagram illustrating such an example that the magnifying glass is overlaid on selected characters, the view being given at the uppermost portion of the screen. FIG. 4B, similarly to FIG. 4A, depicts the state in which the position between "FINE" and "WEATHER" of the sentence "IT IS A FINE WEATHER TODAY." is touched by the finger. The sentence "IT IS A FINE WEATHER TODAY." is, however, displayed in a position near the uppermost portion of the screen. The magnifying glass is so displayed as to be overlaid on the selected characters because of being unable to get space for displaying on the upper side of the touched position. Thus, the magnifying glass, when moving up to the uppermost portion of the screen, without further moving or disappearing, is displayed at the uppermost portion of the screen in a state of keeping a predetermined size.

<Hardware Configuration>

Figure 1:
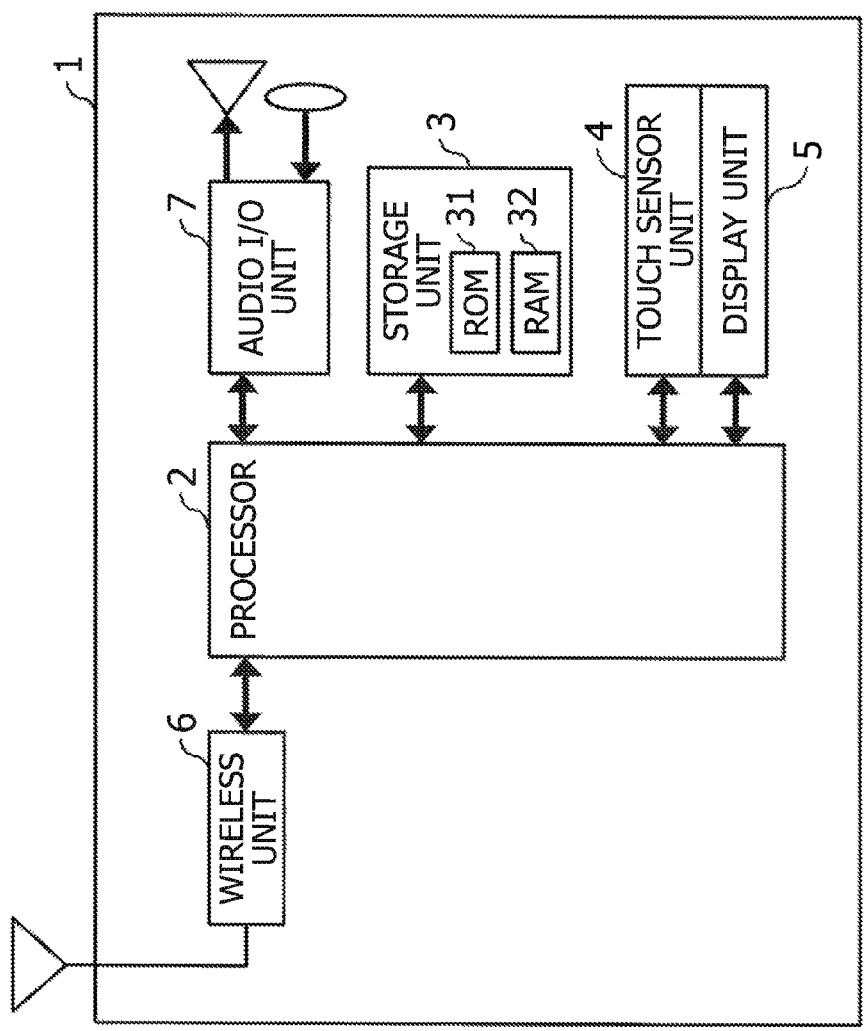
FIG. 1 is a diagram illustrating one example of a hardware configuration of an electronic device.

FIG. 1 is a diagram illustrating one example of a hardware configuration of an electronic device 1. The electronic device 1 includes a processor 2, a storage unit 3, a touch sensor unit 4, a display unit 5, a wireless unit 6 and an audio Input/Output (I/O) unit 7.

The processor 2 is, e.g., a CPU (Central Processing Unit) or a DSP (Digital Signal Processor). The storage unit 3 includes a ROM (Read Only Memory) 31 and a RAM (Random Access Memory) 32. The ROM 31 is a memory in which to store a variety of computer programs and data used by the processor 2 when executing the respective computer programs. The RAM 32 includes both of a volatile memory and a nonvolatile memory. The RAM 32 provides the processor 2 with a storage area for loading the computer program stored in the ROM 31 and an operation area. Further, the RAM 32 is used as a buffer for temporarily retaining the data.

The touch sensor unit 4 is one of position input devices and acquires, when detecting that the display unit 5 is touched, a coordinate of the touched position of the finger on the screen and outputs the acquired coordinate to the processor 2. The touch sensor unit 4 may be of any of a resistance film type, a surface acoustic wave type, an infrared-ray type, an electromagnetic induction type, an electrostatic capacity type, etc.

The display unit 5 is, e.g., a liquid crystal display (LCD). The display unit 5 displays screen data according to a signal inputted from the processor 2.

The wireless unit 6 converts a radio signal received via an antenna into an electric signal and outputs the electric signal to the processor 2, or converts the electric signal inputted from the processor 2 into the radio signal and transmits the radio signal via the antenna. The wireless unit 6 is an electronic circuit that supports, e.g., the 3G (third-generation) mobile communication system.

The audio I/O unit 7 converts an audio signal inputted from an audio input device such as a microphone into the electric signal and outputs the electric signal to the processor 2, or converts the electric signal inputted from the processor 2 into the audio signal and outputs the audio signal to an audio output device such as a speaker.

Note that the hardware configuration of the electronic device 1 may be, without being limited to the configuration illustrated in FIG. 1, properly modified such as addition, replacement and deletion. The electronic device 1 is exemplified by a mobile phone terminal, a smartphone, a tablet terminal, an e-book terminal and a PC.

<Function Block>

FIG. 2 is a diagram illustrating one example of function blocks of the electronic device 1. The electronic device 1 includes, as the function blocks, a magnified view window display unit 10, a magnified view window size change unit 11 and a view target area determining unit 12. The processor 2 executes the computer programs deployed in an executable manner on the storage unit 3 as the magnified view window display unit 10, the magnified view window size change unit 11 and the view target area determining unit 12. However, hardware circuits may execute any one of the magnified view window display unit 10, the magnified view window size change unit 11 and the view target area determining unit 12, or a part of processes of these units.

The magnified view window display unit 10 detects that the display unit 5 is touched and display the magnifying glass on the upper side of the touched position. The horizontal width of the magnifying glass may be the same as a size of width of the display unit 5 and may also be smaller than the size of width of the display unit 5. A vertical width of the magnifying glass may be a predetermined size being set beforehand as an initial value. The magnified view window display unit 10 magnifies and displays contents of the areas anterior and posterior to the touched position on the magnifying glass. Note that when unable to get space for displaying the magnifying glass on the upper side of the touched position, the electronic device 1 may display the magnifying glass so as to be overlaid on the touched position.

The magnified view window size change unit 11 detects a movement of the touched position and changes the size of the magnifying glass. The magnified view window size change unit 11, e.g., when the touched position moves downward, enlarges the vertical width of the magnifying glass, which is displayed by the magnified view window display unit 10 before the finger moves, up to the touched position after being moved. Further, the magnified view window size change unit 12 may enlarge the horizontal width of the magnifying glass up to the size of horizontal width of the screen. On the other hand, when the touched position moves upward, the magnified view window size change unit 11 may display, without enlarging the size of the magnifying glass, the magnifying glass including the post-moving touched position with the vertical width being the initial value.

The view target area determining unit 12 determines a display target area including the post-moving touched position corresponding to the size of the magnifying glass, and displays the determined area on a magnified view window. The view target area determining unit 12 may also determine, as the display target area, an area of a range that includes the post-moving touched position and that can be displayed in the magnifying glass. The pre-moving touched position is one example of a first touched position. Furthermore, the post-moving touched position is one example of a second touched position.

Operational Example

FIG. 7 is a diagram illustrating one example of calculating a display position and a display size of the magnifying glass of the electronic device 1. In FIG. 7, a left upward coordinate of the screen of the electronic device 1 is (0, 0). Further, a right side in a horizontal direction (an X-axis direction) and a lower side in a vertical direction (a Y-axis direction) are positive sides. When the finger touches the screen of the electronic device 1, a touch panel is notified of a coordinate (x, y) of the touched position of the finger. In FIG. 7, the position in which the finger touches the screen of the electronic device 1 is indicated by a coordinate (x1, y1). A symbol "a" represents a size of horizontal width of the magnifying glass, "b" designates an initial value of a size of vertical width of the magnifying glass, and "c" denotes a distance from a lower edge of the magnifying glass to the finger. In the example of FIG. 7, the horizontal width of the magnifying glass is to be a width of the screen. The electronic device 1, when the screen is touched, displays the magnifying glass having the horizontal size "a" and the vertical size "b" in a position defined by a right downward coordinate "(x3, y3)=(a, y1−c)" and a left upward coordinate "(x2, y2)=(0, y1−b−c)".

FIG. 8 is a diagram illustrating one example of a flowchart of processes when detecting a touch event. The touch event occurs when detecting a touch operation on the screen of the electronic device 1. The touch event includes, e.g., a "down" event occurring when the finger touches the screen, a "move" event occurring when the touch finger moves, and an "up" event occurring when the finger takes off the screen. A start of the processes when detecting the touch event is triggered by, e.g., touching the display unit 5 of the electronic device 1 and the magnifying glass being displayed by the magnified view window display unit 10.

In S01, the electronic device 1 detects that the display unit 5 is touched by the finger, and the processing is shifted to S02. In S02, the electronic device 1 stores the coordinate (x1, y1) of the touched position as a coordinate of an origin in the storage unit 3, and the processing is shifted to S03. In S03, the electronic device 1 detects the touch event and stores, in the storage unit 3, a coordinate (x, y) of the touched position when the touch event occurs, and the processing is shifted to S04. In S04, the electronic device 1 determines whether the detected touch event is the "move" event, and the processing is shifted to S05 when being the "move" event but is diverted to S08 whereas when not being the "move" event.

In S05, the electronic device 1 compares a Y-coordinate "y1" of the origin with a Y-coordinate "y" of the post-moving position of the finger, and the processing is shifted to S06 when "y1>y" but is diverted to S07 whereas when "y1<y". The process in S06 is a process in case of "y1>y", i.e., when the finger moves upward from the touched origin. In S06, the electronic device 1 sets a size of the magnified view window to a size of an area defined by a left upward coordinate (0, y−b−c) and a right downward coordinate (x3, y−c) by the magnified view window size change unit 11. The electronic device 1 magnifies and displays the determined display target area on the magnifying glass by the view target area determining unit 12. The process in S07 is a process in case of "y1≤y", i.e., when the finger moves downward from the touched origin. In S07, the electronic device 1 sets the size of the magnified view window to a size of an area defined by a left upward coordinate (x2, y2) and a right downward coordinate (x3, y−c) by the magnified view window size change unit 11. The electronic device 1 magnifies and displays the determined display target area on the magnifying glass by the view target area determining unit 12. After the magnifying glass is displayed in S06 or S07, the electronic device 1 loops the processing back to S03.

The process in S08 is a process when the event is determined not to be the "move" event in S04. In S08, the electronic device 1 determines whether the detected touch event is the "up" event, and the processing is shifted to S09 when being the "up" event but is looped back to S03 whereas when not being the "up" event. In S09, the electronic device 1 hides the magnifying glass, resulting in finishing the processes when detecting the touch event. The electronic device 1 executes the processes in S06 and S07 as one example of enlarging a size of a magnified view window.

The electronic device 1 according to Example 1 dynamically enlarges the size of the magnifying glass corresponding to the movement of the touched position. Therefore, not only the area with the fixed size including the touched position but also the broader area including the post-moving touched position, are displayed as the display target area on the magnifying glass having the enlarged size. Accordingly, this view facilitates looking down upon the broader area including the touched position. Further, the electronic device 1 can display the magnifying glass over also the menu screen etc. not based on a premise of editing in addition to the images based on the premise of editing such as copying and pasting. Hence, when hard to recognize a selected portion concealed by the finger due to the characters being small also on the menu screen etc. not based on the premise of editing, it is feasible to easily confirm the area including the touched position.

Example 2

Figure 5A:
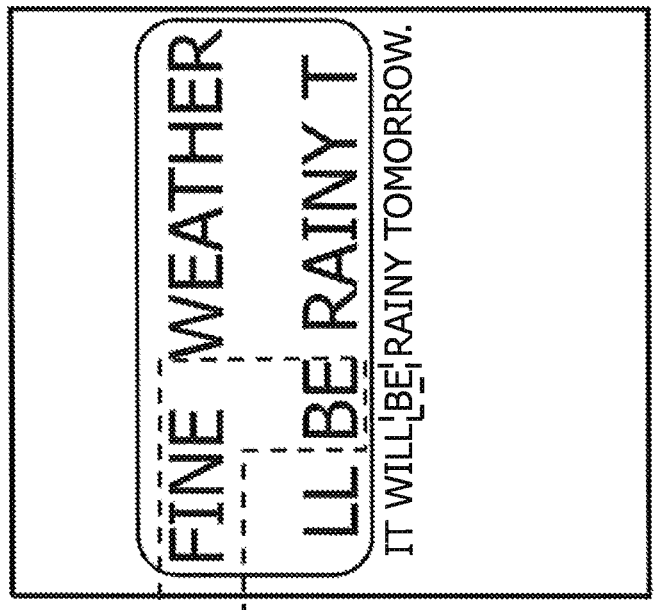
FIG. 5A is a diagram illustrating a display example of the magnifying glass before a finger touching the screen moves downward.
Figure 5B:
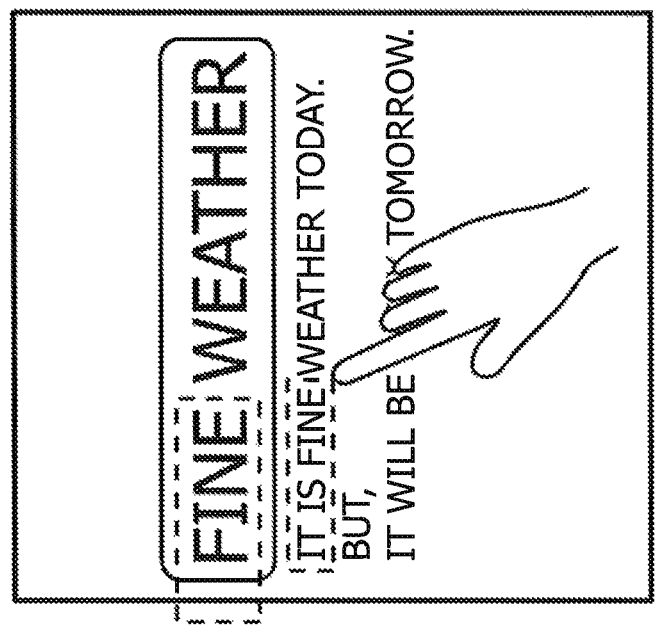
FIG. 5B is a diagram illustrating a display example of the magnifying glass after the finger touching the screen has moved downward.

The Example 2 is an example of enlarging the size in the vertical direction while fixing the horizontal width of the magnifying glass. FIG. 5A is a diagram illustrating a display example of the magnifying glass before the finger touching the screen moves downward. To be specific, FIG. 5A depicts a state in which the finger moves rightward to between "FINE" and "WEATHER" after touching a left edge of a sentence "IT IS A FINE WEATHER TODAY.". In FIG. 5A, the horizontal width of the magnifying glass is the same of the horizontal width of the screen. FIG. 5B is a diagram illustrating a display example of the magnifying glass after the finger touching the screen moves downward. Specifically, FIG. 5B depicts a state in which the finger moves downward to "BE" in the sentence "IT WILL BE RAINY TOMORROW." provided two lines below after the state in FIG. 5A. At this time, the size of the magnifying glass is enlarged downward, while the size of the horizontal width of the magnifying glass remains fixed.

The hardware configuration and then function blocks in the Example 2 are the same as those in the Example 1, and hence the descriptions thereof are omitted. Further, an operational example in the Example 2 is the same as in the Example 1 except a point that the size of the horizontal width of the magnifying glass remains fixed, and hence the description thereof is omitted.

In the electronic device 1 according to the Example 2, the horizontal width of the magnifying glass is fixed, while only the size is enlarged only in the vertical direction, and therefore the magnifying glass does not move in the horizontal direction. Even when the contents to be displayed on the magnifying glass are changed with the movement of the finger, the horizontal width is fixed, and an advantage of being easy to read is yielded.

Example 3

Figure 6A:
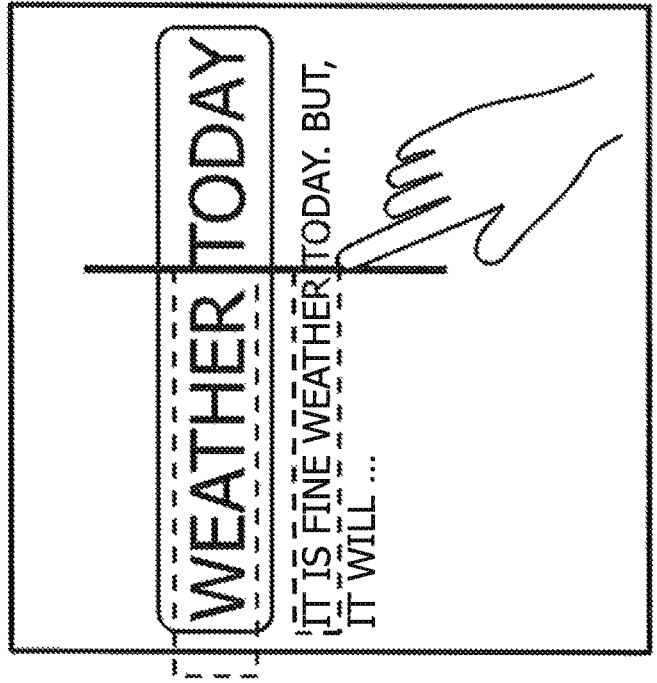
FIG. 6A is a diagram illustrating a display example of the magnifying glass during an operation of selecting the characters.
Figure 6B:
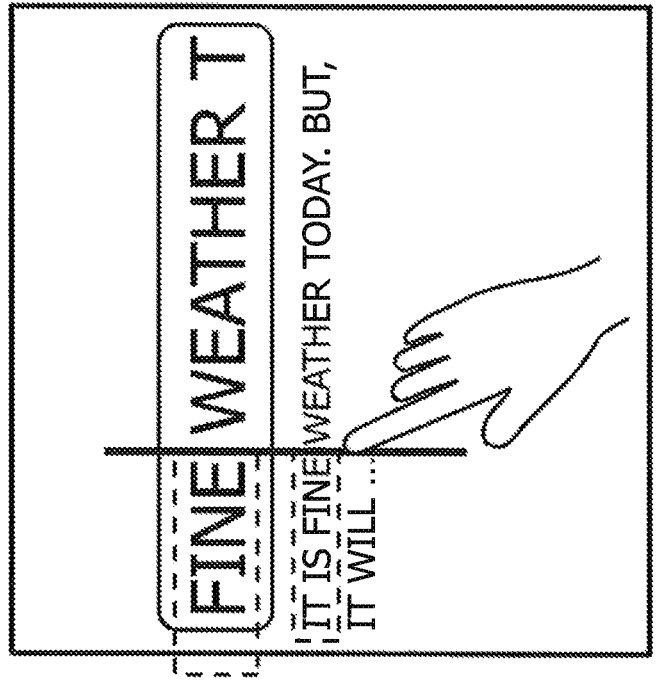
FIG. 6B is a diagram illustrating a display example of the magnifying glass during the operation of selecting the characters.
Figure 6C:
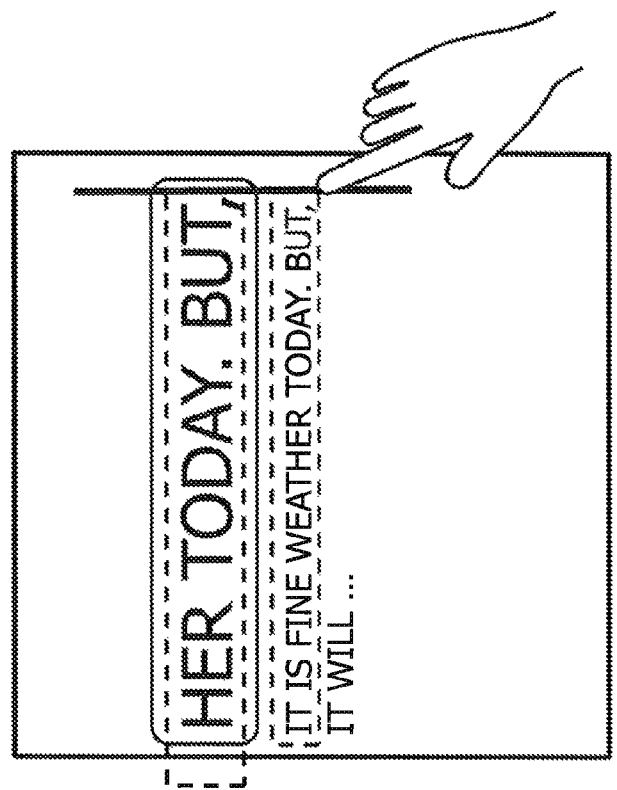
FIG. 6C is a diagram illustrating a display example of the magnifying glass during the operation of selecting the characters.

The Example 3 is an example that the display target area is determined based on the post-moving touched position and a magnifying power of the magnified view. FIGS. 6A through 6C are diagrams each illustrating a display example of the magnifying glass during a character selecting operation.

FIG. 6A depicts a state in which the finger moves rightward to between "FINE" and "WEATHER" after touching a left edge of sentences "IT IS A FINE WEATHER TODAY. BUT, IT WILL BE RAINY TOMORROW.". At this time, the characters "FINE WEATHER T" are displayed on the magnifying glass, and an X-coordinate of a position (between "FINE" and "WEATHER") corresponding to the touched position is equal to an X-coordinate of the touched position. FIG. 6B depicts a state after the finger has moved to between "WEATHER" and "TODAY" and further moved rightward subsequent to the state in FIG. 6A. At this time, the characters "WEATHER TODAY" are displayed on the magnifying glass, and the X-coordinate of a position (between "WEATHER" and "TODAY") corresponding to the touched position is equal to the X-coordinate of the touched position. FIG. 6C depicts a state after the finger has moved to a right edge, i.e., "BUT," of the sentence and further moved rightward subsequent to the state in FIG. 6B. At this time, the characters "BUT, IT WILL BE RAINY TOMORROW" are displayed on the magnifying glass, and the X-coordinate of a position (right side of "BUT,") corresponding to the touched position is equal to the X-coordinate of the touched position.

Each of the display target areas illustrated in FIGS. 6A through 6C is determined by the view target area determining unit 12. To be specific, the view target area determining unit 12 calculates a width of the display target area from the magnifying power of the magnified view and the size of the horizontal width of the magnified view window. Next, the view target area determining unit 12 segments the width of the display target area at the same ratio as a ratio of a distance from the left edge of the screen to the touched position to a distance from the touched position to the right edge of the screen, and calculates the distance from the left edge of the display target area to the touched position and the distance from the touched position to the right edge of the display target area. The view target area determining unit 12 subtracts the distance from the left edge of the display target area to the touched position from the X-coordinate of the touched position, thereby determining the X-coordinate of the left edge of the display target area. Furthermore, the view target area determining unit 12 adds the distance from the touched position to the right edge of the display target area to the X-coordinate of the touched position, thereby determining the X-coordinate of the right edge of the display target area. Thus, the display target area is determined from the post-moving touched position and the magnifying power of the magnified view, whereby the contents displayed on the magnifying glass are moved with the movement of the touched position.

FIG. 10 is a diagram illustrating an example of determining display target area based on the post-moving touched position and the magnifying power of the magnified view. FIG. 10 depicts a state in which the finger touches a portion between "e" and "f" of a character string "abcdefghijk". The magnifying glass is displayed on the upper side of the touched position, and the characters "cdefghi" are magnified and displayed on the magnifying glass. When letting a symbol "a" be the size of the horizontal width of the magnifying glass and setting the magnifying power to 1.5, an area with the horizontal width "a/1.5" including the touched position is displayed as the display target area on the magnifying glass.

FIG. 11 is a diagram depicting a specific example of determining the display target area based on the post-moving touched position and the magnifying power of the magnified view. FIG. 11 depicts a state in which the finger touches a character "i" in the characters "abcdefghijk". The magnifying glass is displayed on the upper side of the touched position, and the characters "cdefghij" are magnified and displayed on the magnifying glass. The size of the horizontal width of the magnifying glass is set to a=15, the X-coordinate of the touched position is given by x=11, and the magnifying power is set to N=1.5, in which case the X-coordinate of the left edge of the display target area and the X-coordinate of the right edge thereof are obtained by the following calculation.

$X$-Coordinate of Left Edge: $(a/N) \times x/a = (15/1.5) \times 11/15 = 7.3x - 7.3 = 11 - 7.3 = 3.7$ $X$-Coordinate of Right Edge: $(a/N) - 7.3 = 10 - 7.3 = 2.7x + 2.7 = 11 + 2.7 = 13.7$ Namely, an area defined by the X-coordinate "3.7" and the X-coordinate "13.7" becomes a horizontal range of the display target area. It may be sufficient that a vertical range of the display target area is so determined as to cover the touched position with the width of, e.g., "(Size of Vertical Width of Magnifying Glass)/N".

The hardware configuration and the function blocks in the Example 3 are the same as those in the Example 1, and hence the descriptions thereof are omitted. Further, then processes in the Example 3 are the same as in the Example 1 except processes, depicted in FIG. 9, of determining the display target area and displaying the determined area on the magnifying glass, and therefore the description thereof is omitted.

Operation Example

FIG. 9 is a diagram illustrating one example of a flowchart of processes of determining the display target area and displaying the determined area on the magnifying glass when detecting the touch event. A start of the processes of determining the display target area and displaying the determined area on the magnifying glass is triggered by, e.g., touching the display unit 5 in the electronic device 1. Herein, let "a" be the size of the horizontal width of the magnifying glass, "b" be the initial value of the vertical width of the magnifying glass, "x" be the X-coordinate of the touched position, "y" be the Y-coordinate of the touched position and "N" be the magnifying power. The example in FIG. 9 exemplifies a case of N=1.5, however, it does not mean that the magnifying power is limited to "1.5".

In S11, the electronic device 1 detects the touch event, and the processing is shifted to S12. In S11, the "down" event and the "move" event are detected as the touch events.

In S12, the electronic device 1 obtains, as the display target area, display contents (bitmap image) in an area defined by the following coordinates, and the processing is shifted to S13.

$X$-Coordinate of Left Edge: $x0 = x - (a \times N) \times x/a$ $X$-Coordinate of Right Edge: $x1 = x0 + (a \times N)$ $Y$-Coordinate of Left Edge: $y0 = y - b$ $Y$-Coordinate of Right Edge: $y1 = y + b$ In S13, the electronic device 1 magnifies the bitmap image obtained in S12 by "N" in the vertical and horizontal directions, and the processing is shifted to S14. In S14, the electronic device 1 displays the bitmap image magnified in S13 on the display position of the magnifying glass, and the processing comes to an end. The electronic device 1 executes the processes in S12 and S13 as one example of displaying a display target area in a magnified view window.

The electronic device 1 according to the Example 3 changes, based on the post-moving touched position and the magnifying power of the magnified view, the contents to be displayed on the magnifying glass. The contents displayed on the magnifying glass are moved with the movement of the touched position, thereby enabling the contents to be read with no sense of discomfort even when the finger moves.

According to the electronic device and the information display program of the disclosure, the broader display target area can be displayed in the magnified view window.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An electronic device comprising:
a memory; and
a processor coupled to the memory and the processor configured to execute a process that causes the electronic device to perform:
displaying a magnified view window to magnify and display an area including a first touched position, the first touched position being a position at which a single touch operation is detected on a touch panel;
enlarging a size of the magnified view window based on the first touched position and a destination position when a single touch moving operation to move a single touch position to the destination position from the first touched position is detected; and
determining a display target area including the destination position corresponding to the size of the magnified view window and to display the display target area on the magnified view window,
wherein the determining includes associating the destination position with a predetermined position of the magnified view window,
wherein the magnified view window is displayed on upper side of the destination position on a screen and a horizontal line coordinate of the predetermined position of the magnified view window on the screen is coincident with a horizontal line coordinate of the destination touched position on the screen.

2. The electronic device according to claim 1, wherein the enlarging includes fixing a horizontal width of the magnified view window, and enlarging a vertical size thereof.

3. The electronic device according to claim 1, wherein the determining includes determining the display target area in a range enabled to be displayed on the magnified view window at a predetermined magnifying power.

4. A non-transitory computer-readable recording medium having stored therein a program for causing a computer to execute information display process comprising:
displaying a magnified view window to magnify and display an area including a first touched position, the first touched position being a position at which a single touch operation is detected on a touch panel;
enlarging a size of the magnified view window based on the first touched position and a destination position when a single touch moving operation to move a single touch position to the destination position from the first touched position; and
determining the display target area including the destination position corresponding to the size of the magnified view window and displaying the display target area in the magnified view window,
wherein the determining includes associating the destination position with a predetermined position of the magnified view window,
wherein the magnified view window is displayed on upper side of the destination position on a screen and a horizontal line coordinate of the predetermined position of the magnified view window on the screen is coincident with a horizontal line coordinate of the destination position on the screen.

* * * * *